Oct. 26, 1948.    F. E. FLADER    2,452,447
ARRESTING GEAR
Filed Aug. 29, 1934    2 Sheets-Sheet 1

INVENTOR.
FREDRIC E. FLADER
BY
ATTORNEYS.

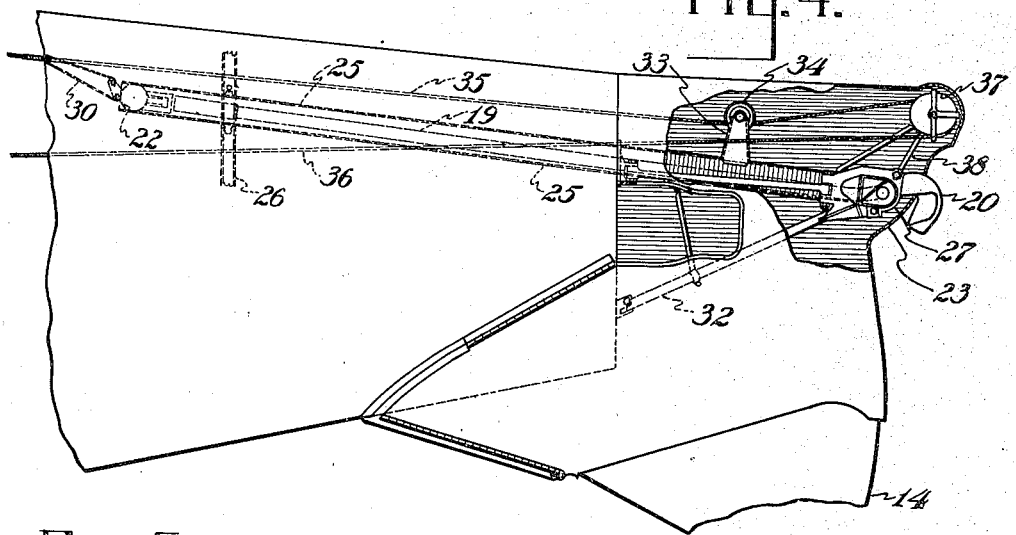
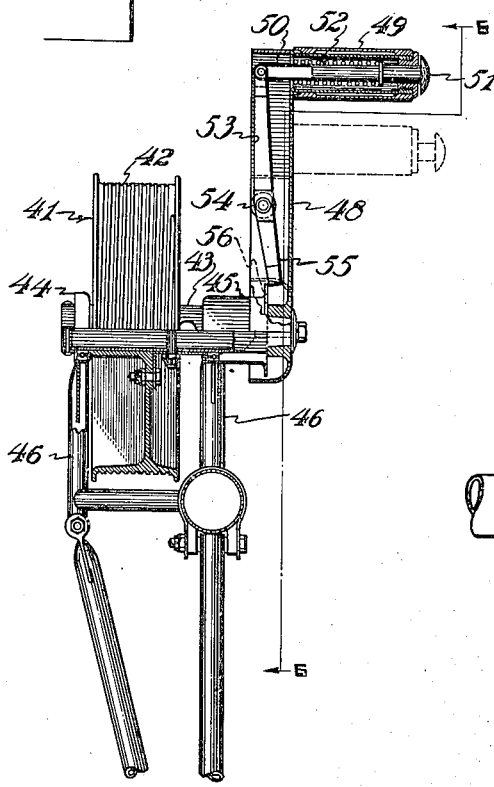
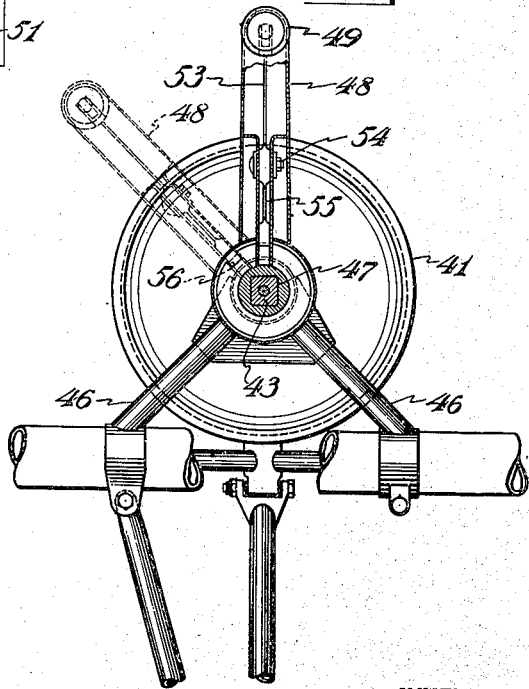

Patented Oct. 26, 1948

2,452,447

UNITED STATES PATENT OFFICE 2,452,447

ARRESTING GEAR

Fredric E. Flader, Kenmore, N. Y., assignor, by mesne assignments, to Curtiss-Wright Corporation, a corporation of Delaware Application August 29, 1934, Serial No. 741,893

14 Claims. (Cl. 244—110)

This invention relates to aircraft, and is particularly concerned with improvements in arresting gears of the type used in conjunction with aircraft organized for landing in limited areas.

Certain types of aircraft are particularly designed for taking off and landing on the deck of a ship, the ship deck being provided with transverse cables raised thereabove, while the aircraft is provided with a depending hook arranged for engagement with one of the cables when the aircraft is close to the deck. The conventional practice in the arresting hook organization has been to hinge a tension member at the lower surface of the fuselage, about midway of the fuselage length, this shank having a hook at its rearward end and extending rearwardly to a point just forward of the tail wheel or other ground contact element. These arresting gears are provided with mechanism whereby they may be drawn against the lower surface of the fuselage during flight, and whereby they may be lowered prior to landing, so that the shank and hook slant downwardly and rearwardly from the point of attachment of the shank to the fuselage. Upon engagement of the landing surface by the aircraft, the gear is swung upwardly and rearwardly, after which the arresting cables are disconnected and the aircraft may proceed along the landing surface. The prior organizations of arresting gears have been generally satisfactory, but it has been found that the attachment of the arresting gear to a mid portion of the fuselage permits of excessive "tail rise" when landing. The point at which the arresting force acts on the aircraft is not very far removed from the aircraft center of gravity, so that when the aircraft impinges on the landing surface, the tail may bounce or rise and the arresting force is not sufficiently far removed from the center of gravity to immediately pull the tail down and hold it down.

This invention contemplates the location of the arresting gear at the extreme tail end of the fuselage, so that after engagement of the arresting cable by the arresting hook, rising of the aircraft tail is substantially prevented; the arresting force acts at a point as far removed from the center of gravity of the aircraft as possible.

A further object of the invention is to provide an arresting gear which may be completely retracted within the aircraft fuselage. In the prior forms of arresting gears, even when retracted, they have projected into the air stream during flight, and thus have caused an unnecessary amount of drag. By retracting the arresting gear wholly within the fuselage when said gear is not in use, the additional drag occasioned by the gear is entirely eliminated.

Further objects are to provide mechanism for moving an arresting gear from a wholly retracted position within an aircraft to a battery position rearward of and below the aircraft; to provide a unitary mechanism for successively translating an arresting gear rearwardly from a retracted position within the aircraft, and for swinging the arresting gear downwardly to a battery position below and rearwardly of the aircraft; to provide an operating gear whose limits of movement are defined by stops, one stop defining the retracted position of the arresting gear and the other stop defining the fully extended battery position of the arresting gear; to provide resilient means in conjunction with an arresting gear extending and retracting mechanism which will permit of movement of the arresting gear relative to the aircraft upon landing of said aircraft.

Further objects will become apparent in reading the annexed specification and claims, and in viewing the drawings, in which similar numbers indicate similar parts, and in which:

Fig. 4 is a view similar to Fig. 3, showing the arresting gear in retracted position;

Fig. 5 is a front view, partly in section, showing the operating means for the arresting gear; and Fig. 6 is a section on the line 6—6 of Fig. 5.

Figure 1:
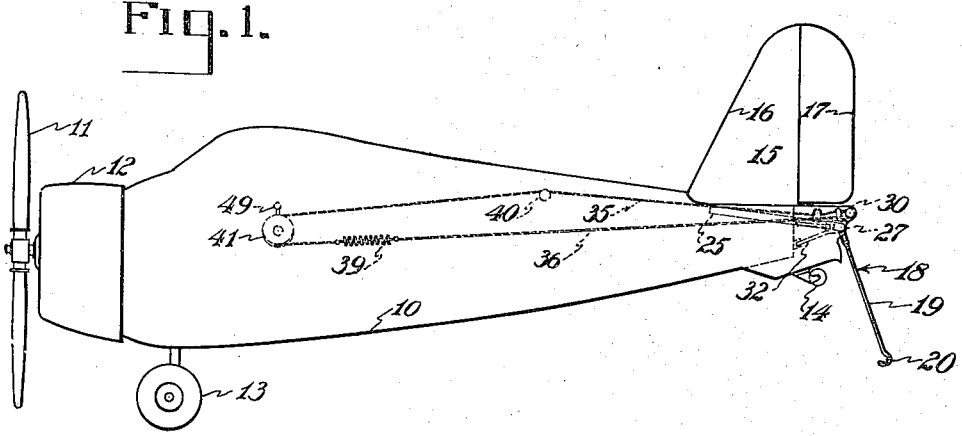
Fig. 1 is a side elevation of an aircraft showing the arresting gear of this invention in battery position.
Figure 2:
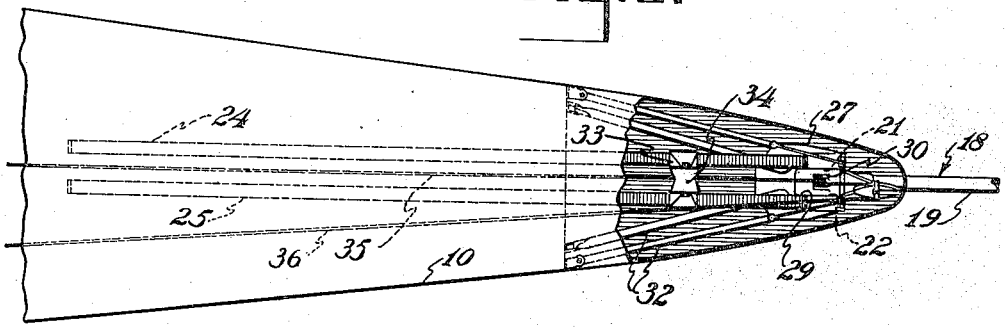
Fig. 2 is an enlarged plan view of the rearward end of an aircraft fuselage, partly broken away, to show the arresting gear mechanism.
Figure 3:
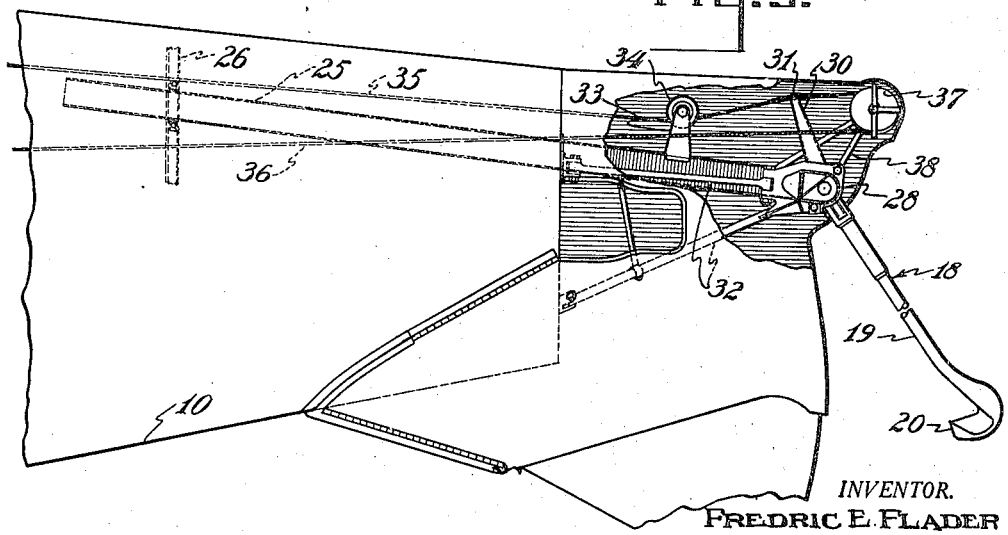
Fig. 3 is a side elevation of the rearward portion of an aircraft fuselage, partly broken away, to show the arresting gear mechanism in its battery position.

An aircraft fuselage 10 is provided with the usual tractor propeller 11 and cowled power plant 12. A conventional forward landing gear 13 depends from the forward fuselage portion, and a conventional tail ground contact element 14 depends from the rearward portion of the fuselage 10. As shown, the element 14 comprises a tail wheel. Also, at the rearward portion of the fuselage 10 an empennage 15 is organized, that portion of the empannage shown comprising a vertical fin 16 and rudder 17. The aircraft will also include horizontal stabilizers and elevators, not shown, but located on the fuselage just below the fin and rudder. An arresting gear 18 comprises a shank 19 and a hook 20, the shank, at its upper end, being provided with a transverse shaft on which are mounted rollers 21 and 22. The extreme tail end of the fuselage is provided with an opening 23 through which the upper portion of the shank 19 extends. Within the aircraft, and extending forwardly from the opening 23 are opposed track elements 24 and 25, each track element comprising a channel section having inturned flanges within which the rollers 21 and 22 are respectively adapted to engage. The track elements 24 and 25 are carried on suitable brackets 26 attached to the fuselage structure. The tracks 24 and 25 may conventionally be fabricated from relatively light gauge sheet metal to reduce weight. At the rearward end of the tracks 24 and 25 a strong fitting 27 is arranged, this fitting having forward end openings matching with the rearward ends of the tracks 24 and 25, whereby the rollers 21 and 22 may enter the fitting. The rearward end of the fitting is closed as at 28 to provide an abutment against which the rollers 21 and 22 may abut when the rollers are in their rearmost position. A central longitudinal slot 29 is provided in the fitting whereby the arresting gear shank 19 may freely move therein. The shank 19 is provided with an arm 30 extending upwardly beyond the rollers 21 and 22, this arm having at its upper end a bolt 31, or the like, to which cables may be attached. The fitting 27 is rigidly fixed to the fuselage structure by means of a plurality of braces 32, so that landing shocks transmitted through the shank 19 are passed to the fuselage structure. A bracket 33 is mounted on the tracks 24 and 25 forwardly of the fitting 27, this bracket carrying a roller 34 under which a cable 35 is adapted to pass. The cable 35 is attached to the bolt 31. A second cable 36 is attached to the bolt 31 and extends rearwardly over a pulley 37 mounted on a bracket 38 which in turn is carried above and rearwardly of the fitting 27. The cable 36 then runs forwardly, as shown in Fig. 1, to be attached to a spring 39. The cable 35, likewise, runs forwardly from the roller 34, over a guide pulley 40, over a drum 41, and thence rearwardly to be attached to the forward end of the spring 39. The drum 41, as will be described in greater detail hereinafter, provides a means for translating the cables 35 and 36. The roller 34 and the pulley 37 are mounted at different levels, the pulley 37 being well above the lower face of the roller 34. The operation of the device thus far described is as follows: Assuming the arresting gear to be in a retracted position, as shown in Fig. 4, the drum 41 may be turned counterclockwise to translate the upper run of the cable 35 rearwardly. Such translation moves the rollers 21 and 22 from the forward end of the tracks 24 and 25 rearwardly until said rollers enter the fitting 27 and engage against the abutment 28. Further translation of the cable 35 rearwardly will cause the arresting gear 18 to be swung downwardly about the pivot established by contact of the rollers with the abutment 28, to a battery position. Such swinging may not take place until the bolt 31 has passed under the roller 34. Thereupon, the arm 30 must swing as the gear 18 may not move rearwardly any further. In the process of swinging the gear 18 downwardly, the cables 35 and 36 would be placed under considerable tension which is transmitted to the spring 39. Thus, although the cables, when the gear is retracted, are only reasonably tight, they are placed in a considerable tension when the gear is fully extended, thus tending to resiliently hold the gear 18 in its battery position. When in battery, and when the hook 20 engages the landing surface, causing the gear 18 to swing upwardly, such upward swinging is assumed by the spring 39 acting through the cable 36, the bolt 31, and the arm 30. The spring, then, tends to hold the gear 18 in engagement with the landing surface.

In retracting the arresting gear, the drum 41 is turned counter-clockwise, causing the cable 35 to move forwardly. In the first phase of such movement, the arm 30 is swung forwardly and downwardly, causing the gear to assume a trailing position behind the aircraft. Further forward translation of the cable 35 moves the bolt 31 under the roller 34, after which the gear 18 is drawn inwardly along the tracks 24 and 25. When retracted, the gear 18 is carried wholly within the fuselage whereby it may offer no parasite drag in flight. When extended, the gear extends below and rearwardly of the aircraft so that, when the hook 20 engages the landing surface and its associated arresting cables, the arresting stresses are transmitted directly to the aircraft fuselage at a point remote from the aircraft center of gravity, thus minimizing the possibility of "tail rise" after the arresting cables and gear are in engagement.

The drum 41, shown in detail in Figs. 5 and 6, is formed with a helically grooved surface 42 whereby the cable 35 which runs over the drum, is properly guided and is in firm frictional engagement with the drum surface. The drum is provided with an axle 43 carried in bearings 44 and 45 suitably mounted on brackets 46 to the fuselage structure. The inner end of the axle 43 is squared or splined, as at 47, to carry a crank 48 having an operating handle 49. This handle is hollow, and carries a plunger 50 having a thumb button 51 for pressing the plunger inwardly against a spring 52 mounted within the handle 49. The plunger 50 acts upon a lever 53 pivoted at 54 to the crank 48, the lower end 55 of the lever being arranged to engage in a slot 56 formed on the outer surface of the bearing 45. The diameter of the drum 41 is of such size that a predetermined number of full turns thereof will bring the arresting gear to either a fully extended or a fully retracted position. Therefore, the dotted line position of the crank shown in Figs. 5 and 6 is the position for full extension or full retraction of the arresting gear. The full line position of Figs. 5 and 6 shows an intermediate position of the crank wherein the thumb button 51 has been depressed so that the lever 53 may disengage the slot 56, and shows a position, for instance, where the bolt 31 may have just passed rearwardly of the roller 34. At this point, then, the tension on the cable will increase, and it is necessary for the operator to firmly push the crank to the dotted line position, whereupon he is assured that the arresting gear is fully extended and ready for a landing.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with an aircraft fuselage, of a trunnion at the extreme rearward end thereof, an arresting gear comprising a shank, a hook mounted thereon and journals toward an end of said shank for engagement with said trunnions, a track extending forwardly from said trunnions within said fuselage, and means for retracting said gear comprising means engaging said shank and operable to move said journals forwardly from said trunnions along said track.

2. The combination with an aircraft fuselage of a trunnion at the extreme rearward end thereof, an arresting gear comprising a shank, a hook carried thereon and a journal on said shank for engagement with said trunnion, and means to swing said gear about and to move the gear with respect to said trunnion, in a substantially vertical plane, between a battery position rearward of and below said fuselage and an inactive position wherein said shank is substantially parallel to the longitudinal axis of and substantially wholly within the confines of said fuselage.

3. In aircraft having a fuselage, an arresting gear mounted for longitudinal movement of said fuselage and for subsequent vertical swinging relative thereto, unitary means successively operable to effect said longitudinal movement and for subsequently effecting said vertical swinging.

4. In an aircraft fuselage having an opening at the rearward end thereof, a track within said fuselage having an abutment at its rearward end adjacent said opening, an arresting gear comprising a shank having a journal toward an end thereof engaging said track and capable of contact with and pivoting relative to said abutment, an arm on said shank beyond said journal, and translatable means attached toward the end of said arm, said means being operable to translate said gear along said track, and, after said journal has engaged said abutment, to then swing said arm and said gear about the pivot formed by said abutment.

5. In aircraft having an arresting gear translatable and swingable with respect thereto from a retracted position within said aircraft to a battery position rearward of and below said aircraft, cable means translatable to effect the indicated translation and swinging of said gear, a drum operable by the aircraft crew for translating said cable, and stop means cooperating with said drum for permitting turning thereof only between fully retracted and battery positions of said gear.

6. In aircraft having a fuselage, an arresting gear mounted for translation and swinging from a fully retracted position within said fuselage to a battery position rearward of and below said fuselage, resilient means for urging said gear in said battery position during landing, a cable carrying said resilient means for extending and retracting said gear, and means for locking portions of said cable when said gear is extended against movement under the influence of operation of said resilient means during landing.

7. In aircraft having a fuselage, an arresting gear mounted therein for translation and swinging between a retracted position within said fuselage to a battery position without said fuselage, a cable attached to said gear, means for guiding said cable to allow translation only of said gear, and means for guiding said cable to allow swinging of said gear.

8. In an aircraft fuselage, a substantially fore and aft track in the rearward end thereof, said track having an abutment at its rearward end, a shank having one end guided in said track and carrying a hook at its other end for engagement, when extended, with a landing area, means for moving said shank forwardly and rearwardly along said track, said means being operative to hold the said shank substantially parallel to said track in positions thereof forward of said abutment, and being operative when said shank is in a rearward position engaging said abutment to swing said shank downwardly.

9. In a fuselage, an arresting gear shank axially movable into and from the rearward fuselage end, and means for turning said shank downwardly about an end thereof after the shank has been moved axially beyond the fuselage.

10. In a fuselage having an arresting gear arranged for two-phase extension and retraction wherein said shank is first axially extended from said fuselage and is then turned to a landing position, unitary means operable to consecutively move said gear through said two phases.

11. An arresting gear for aircraft comprising a shank hooked at one end and pivotally and translatably mounted in said fuselage at its other end, and continuously operable means for consecutively moving said shank through its translatory and pivotal phases of movement.

12. In an arresting gear for aircraft having a fuselage including a track within the fuselage, an arresting gear shank having track-engaging means toward one end thereof, an element on said shank spaced from said track-engaging means, a cable attached to said element, and means for moving said cable whereby said shank is translated along said track until said track-engaging means reaches an end of said track, said cable being further movable to swing said shank about said track end after termination of translatory movement thereof.

13. The combination with an aircraft fuselage having an opening in its rearward end, of an arresting gear comprising a shank and hook thereon, means for withdrawing said shank through said opening and for extending said shank beyond said opening, means to arrest translation of said shank and means to cause said shank to swing in a vertical plane when said translation is arrested.

14. In an aircraft having a fuselage, an arresting gear comprising a shank mounted at one end to the extreme rearward end of said fuselage, said shank having a hook at its other end, and means for translating said shank to a position wholly within said fuselage including cables and means to place tension on said cables in one translated position of said shank.

FREDRIC E. FLADER.

REFERENCES CITED

The following references are of record in the file of this patent:

UNITED STATES PATENTS

| Number | Name | Date |
|---|---|---|
| 1,127,028 | Lake | Feb. 2, 1915 |
| 1,360,454 | Shaw | Nov. 30, 1920 |
| 1,647,619 | Hall | Nov. 1, 1927 |
| 1,816,228 | Minshall | July 28, 1931 |

FOREIGN PATENTS

| Number | Country | Date |
|---|---|---|
| 129,705 | Great Britain | July 24, 1919 |
| 511,060 | France | Sept. 17, 1920 |
| 660,404 | France | Feb. 18, 1929 |